Aug. 1, 1967  J. D. MITCHELL  3,333,786
TWINE MOUNTING
Filed March 13, 1964
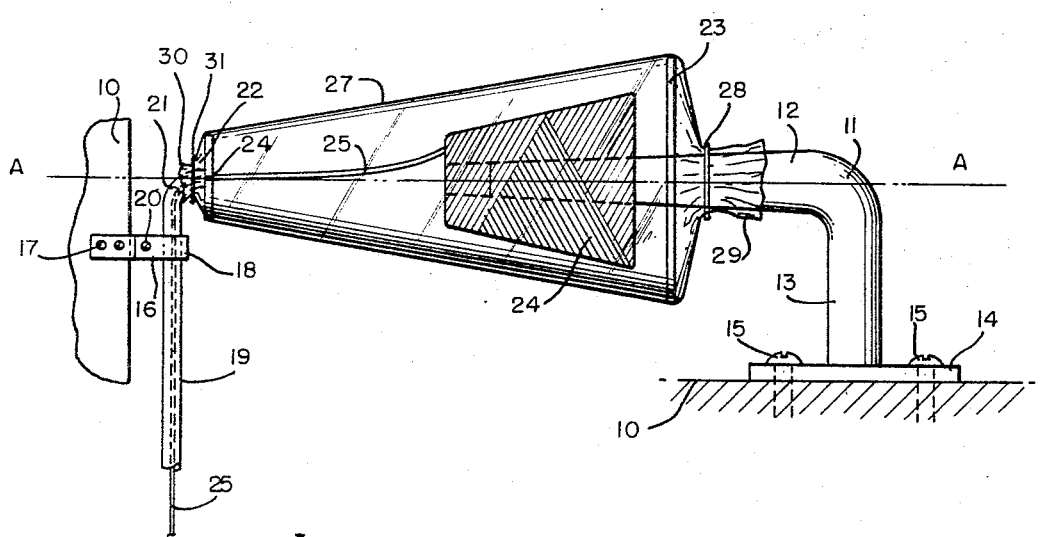
FIG. 1.
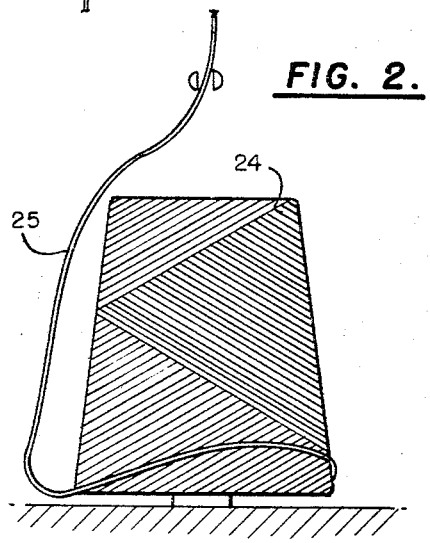
FIG. 2.
FIG. 3.

United States Patent Office 3,333,786
Patented Aug. 1, 1967

3,333,786
TWINE MOUNTING
John D. Mitchell, Woodville, N.C., assignor to Harrington Manufacturing Company, Lewiston, N.C., a corporation of North Carolina
Filed Mar. 13, 1964, Ser. No. 351,745
1 Claim. (Cl. 242—146)

The present invention concerns a means for mounting multi-filament nylon ribbon twine on a tobacco harvester.

It is an object of the invention to provide a mounting means for tobacco twine made of nylon, which supports the twine in position so that it will not sag or snarl and interrupt harvesting.

It is an object of the invention to provide a novel mounting for a cone of nylon twine which completely encloses the twine, supports it in a desired position, and makes the supply visible so that the amount of twine remaining on the cone can be checked at any time.

It is an object of the invention to supply spaced permanent mounting means on the harvester frame for a ball of nylon tobacco twine, in which the twine ball is covered by a stretch sleeve of clear transparent plastic which is firmly held in place.

It is an object of the invention to provide means for mounting a cone of nylon twine for tobacco harvesters in a horizontal position and to support the twine to prevent snarls and tangles.

It is an object of the invention to provide mounting means for multi-filament nylon ribbon tobacco tying twine which is capable of being flattened to apply a substantial area of flattened surface of the twine when wrapped around a tobacco stem so as to reduce the stress of the twine on the tobacco leaves and stems and to eliminate damage to the harvested tobacco leaves.

Another object of this invention is to shield the twine from the wind, rain, etc., in an improved manner.

Still another object of the invention resides in the provision of means which allows the twine to be removed from the spool without tangling.

Other objects of the invention will appear from the drawings and a reading of the specification.

In the drawings, like numerals refer to like parts throughout.

FIGURE 1 is a plan assembly view of the invention in use as mounted on a tobacco harvester frame.

FIGURE 2 is an elevational view of a conventional twine mount.

FIGURE 3 is a fragmentary view of a portion of a multifilament nylon ribbon twine used in tobacco harvesters, showing the manner in which the twine flattens so as to reduce the stress applied by the twine to tied hands of tobacco to eliminate cutting of the stems.

Harvester frame 10 has mounted thereon a Land's bracket 11 with a tapered mandrel 12 extending at right angles from the shank 13 and in a substantially horizontal position. Shank 13 of bracket 11 is supplied with a flange 14 which may be bolted to frame 10 by bolts 15. Holding clamp 16 is mounted on frame 10 by means of screws 17 in spaced relation to the mandrel 12. Clamp 16 is provided with a loop 18 surrounding a tube 19 which may be clamped in place by means of screw 20. Tube 19 is preferably positioned vertically on frame 10 and at its upper end is provided with a right angle bent 21 terminating in an open flange 22 which is aligned with the axis of mandrel 12 so that a disc 23 mounted on mandrel 12 is parallel with open flanging 22. Open flanging 22 and disc 23 are preferably circular in outline and are spaced along the same axis AA to which they are perpendicular. Open flanging 22 and disc 23 determine a portion of the right circular cone. Positioned on the tapered end of mandrel 12 is a cone 24 of multi-filament nylon ribbon suitable for tying tobacco hands. The filament 25 from the free end of cone 24 is led through a central hole in open flange 2 and down through tube 19 at the station where it is to be used. After the cone 24 is positioned on mandrel 12 and before filament 25 is led through the opening and down through tube 19, a tapered sleeve 27 of transparent plastic material is slid over the cone 24 and disc 23 and the end 29 thereof is tied around the mandrel 12 at the base of disc 23 by a cord or holding means such as 28. Filament 25 is then threaded through the tube 19 and the other end 30 of sleeve 27 is slid over open flange 22 and tied around the upper part 21 of tube 19 by cord 31.

The filament 25 is led from the end of tube 19 to the station where it is to be used. On some harvesters this station will be adjacent a looper stand where the cord may be readily grasped for hand looping of tobacco bundles. In machines having a sewing head the filament 25 passes through a suitable tensioning device which feeds it to the needle of the sewing head at a desired tension. Filament 25 may be oval in cross section and have a tendency to flatten out whenever transverse forces are applied thereto, as when it is wrapped around a bundle of tobacco leaves. This flattening effect is shown at 32 in FIGURE 3. Nylon cord of the type at 25 is quite light and is easily blown by the wind. Also, it has a tendency to fall from the cone 24 and to cause a tangle or snarl which interrupts harvesting while the cord is untangled or the snarl is cut out. The sleeve 27 has been found to eliminate the snarls resulting from the use of nylon twine on tobacco harvesters. When the filament 25 drops off the cone 24 it is supported in position so that it may be readily drawn through the tube 19. In the horizontal position of the cone the filament 25 feeds readily from the cone as needed, and with the protection of the sleeve 27 it is maintained in just the right position for maximum efficiency in harvester operation. This construction has been found to be a substantial improvement over the vertical mounting of a cone of twine as shown in FIGURE 2, where the twine tends to fall down and drape around the bottom of the cone 24.

I claim to have invented:

Apparatus for feeding twine comprising a horizontal tapering support, a cone-shaped spool of twine having an axial hole therein into which said support extends, a tube located around the spool and tapering in the same direction as the spool tapers, means for holding the tube in spaced relation with said spool, a flexible element connecting the large end of the tube to said support, said tube having an outlet at its small end, and a smaller tube extending away from said outlet to guide the twine in the desired direction.

References Cited
UNITED STATES PATENTS
1,020,401  3/1912  Courtland _____ 242—137
FOREIGN PATENTS
449,714  7/1936  Germany.

LEONARD D. CHRISTIAN, Primary Examiner.
FRANK J. COHEN, Assistant Examiner.